United States Patent Office 2,759,589
Patented Aug. 21, 1956

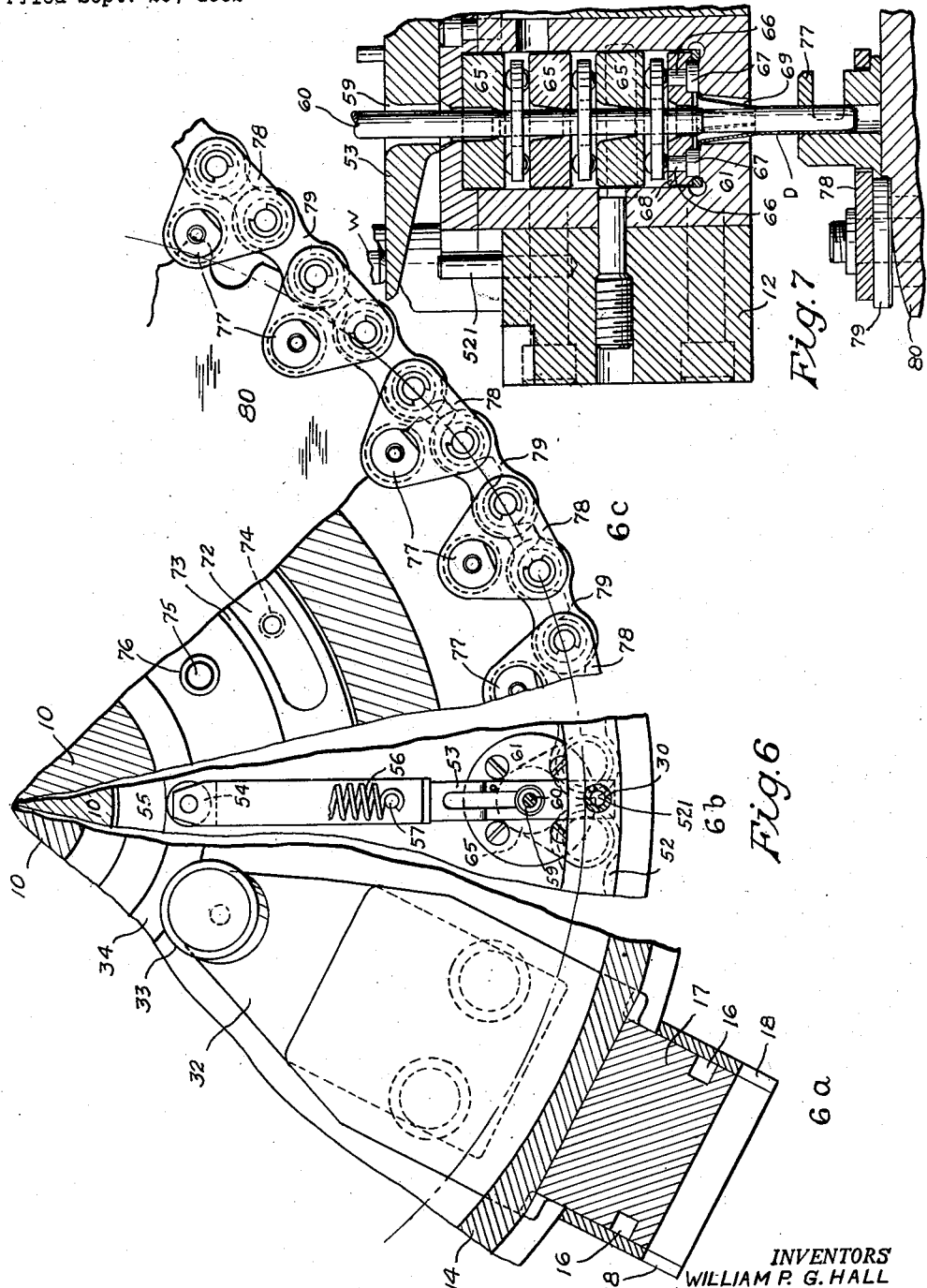

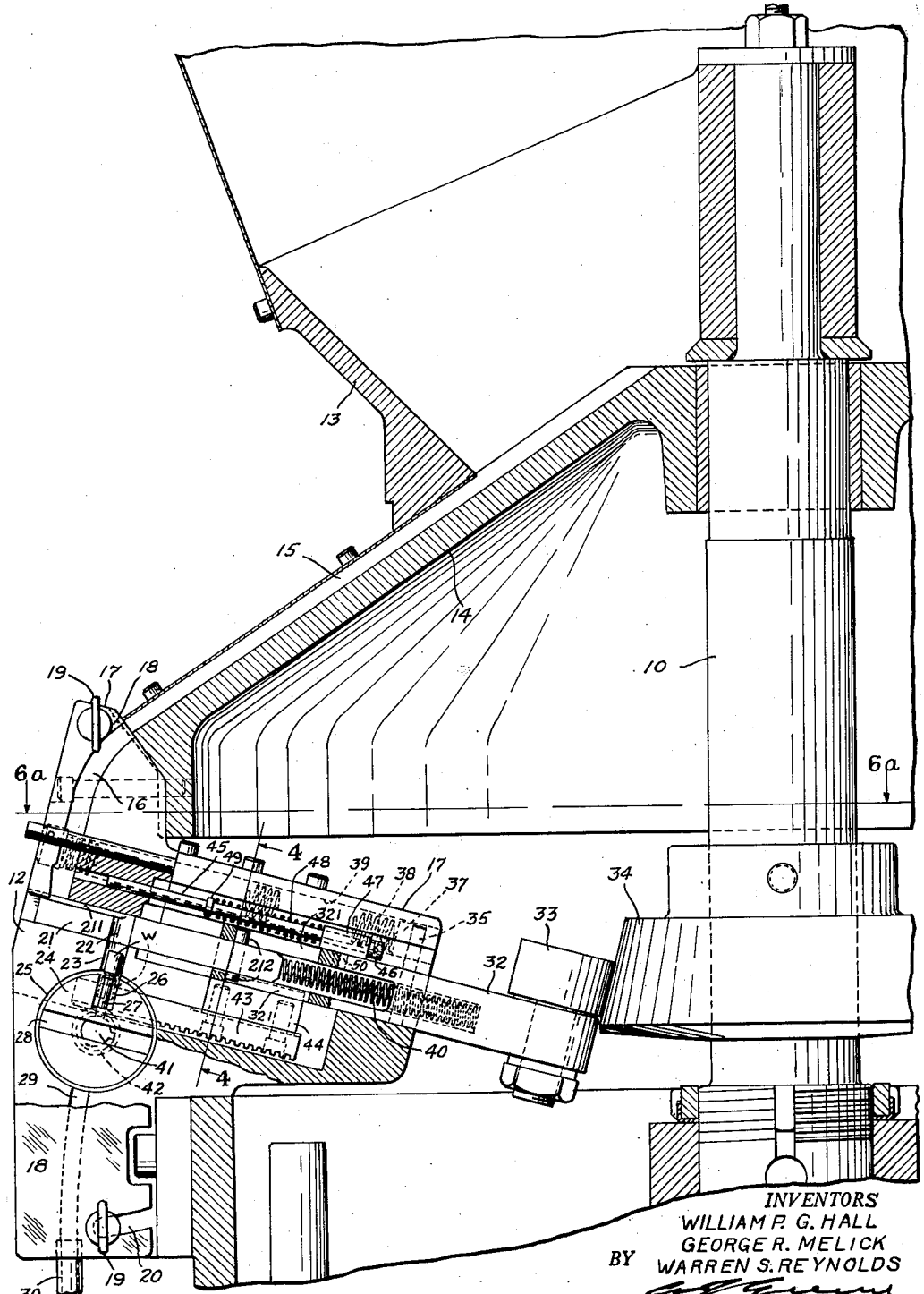

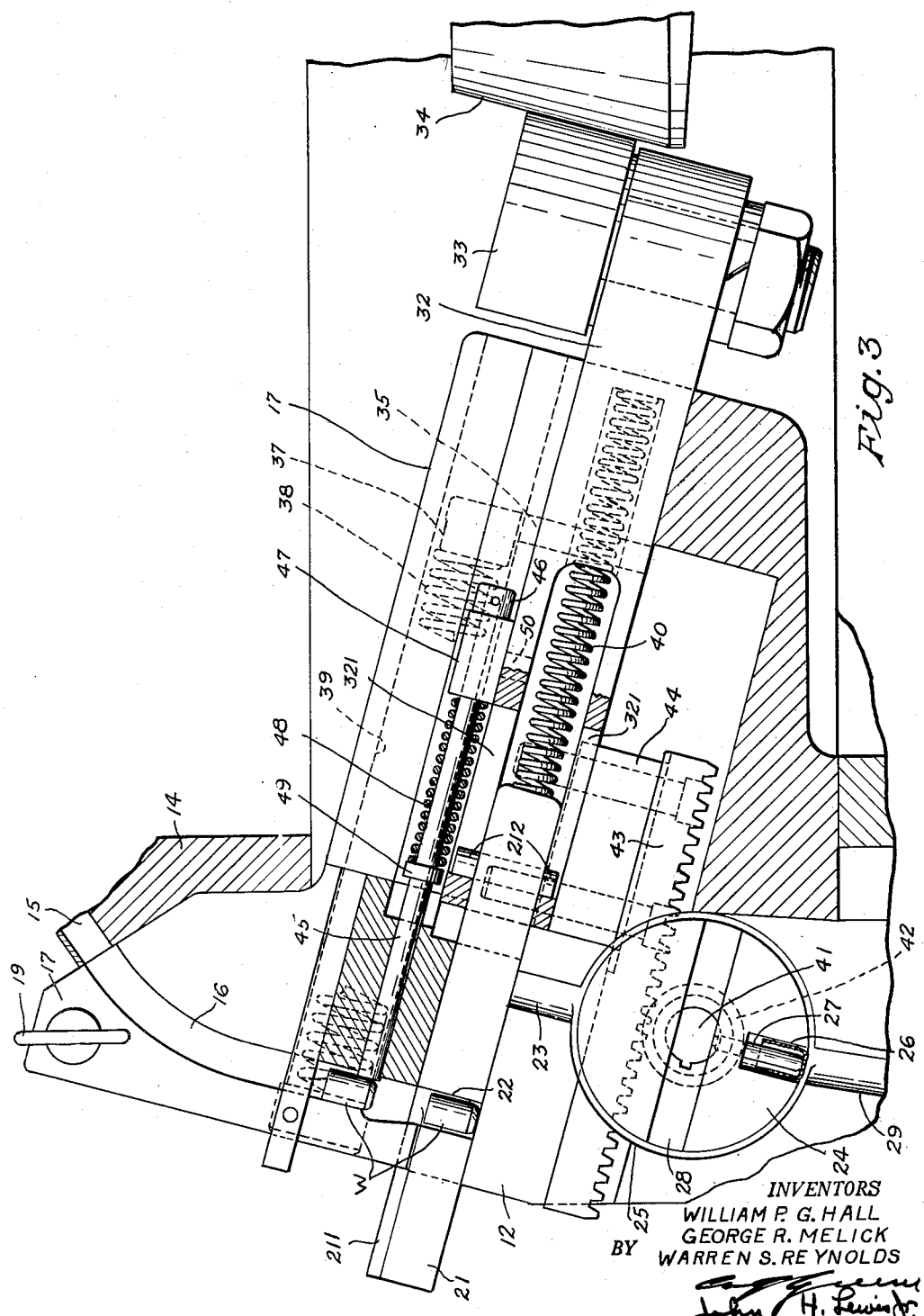

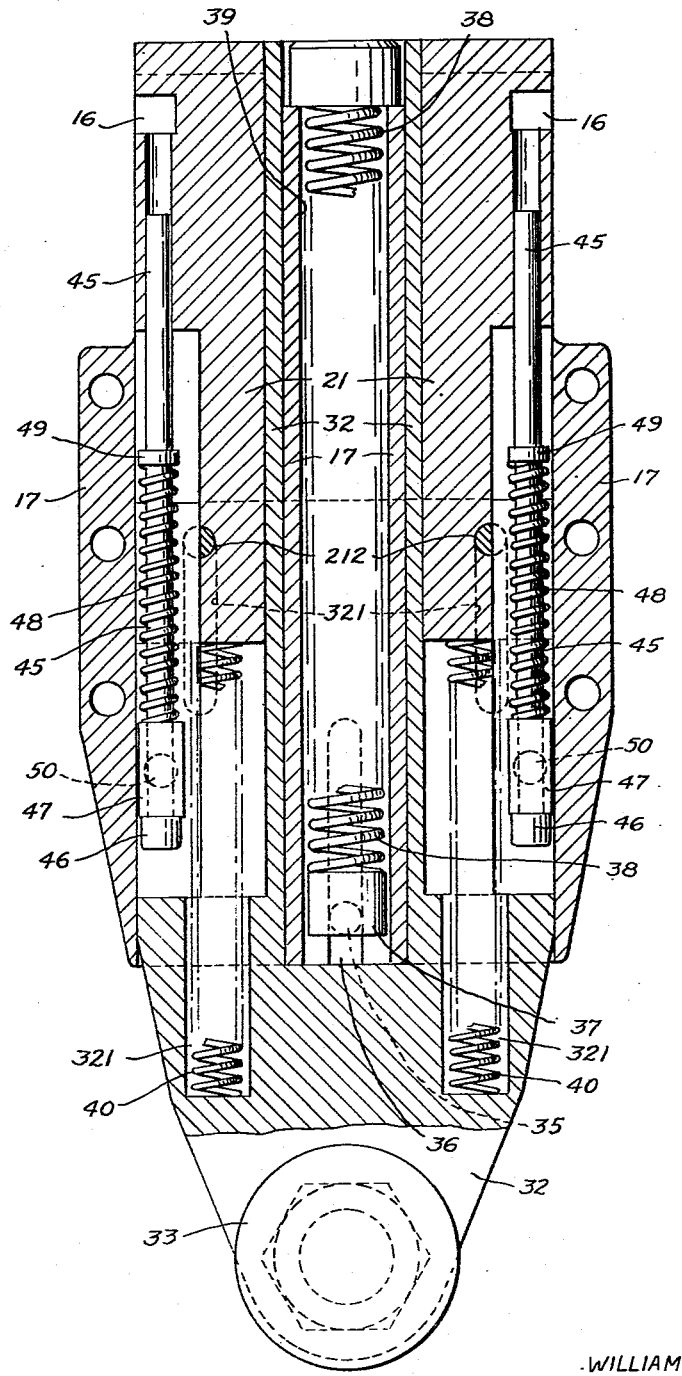
Fig. 5
INVENTORS
WILLIAM P. G. HALL
GEORGE R. MELICK
WARREN S. REYNOLDS
BY
ATTORNEYS

2,759,589

ARTICLE ARRANGING MECHANISM

William P. G. Hall, Berwyn, Pa., and George R. Melick, Fairfield, and Warren S. Reynolds, Westport, Conn., assignors to Remington Arms Company, Inc., Bridgeport, Conn., a corporation of Delaware Application September 29, 1952, Serial No. 312,128

14 Claims. (Cl. 198—33)

This invention relates to a machine for continuously and automatically withdrawing workpieces from a supply, arranging such workpieces in column, orienting each workpiece in turn to a desired position, feeding each workpiece to tools which operate thereon, and delivering each workpiece in a predetermined position to a receptacle on a conveyor. More specifically, the invention contemplates the continuous feeding and drawing of a succession of cup-shaped workpieces, and the delivery of each drawn cup or tube to a conveyor receptacle.

The machine is of the type comprising a turret body which revolves about a fixed pedestal or column carrying a fixed cam associated with each operation to be performed. A plurality of tools are mounted in the rotating turret body, and a plurality of tool operating devices associated with the tools respectively or with groups of tools are actuated by the fixed cams. Generally stated, the succession of operations performed on each workpiece comprise orienting the cup-shaped workpiece to head-down position, feeding the oriented workpiece into alignment with a stack of draw dies, and actuating a draw punch to push the workpiece through the draw dies and into a conveyor receptacle.

Figs. 1 and 1a together are a fragmentary partly diagrammatic sectional elevation of the machine as a whole, showing the cup orienting mechanism and the draw punch in retracted or normal position.

Fig. 3 is a radial sectional elevation of the cup orienting device and its operating mechanism, shown in fully advanced position for effecting the delivery right-side-up of a cup presented to the device in inverted position.

Fig. 5 is a fragmentary horizontal section, substantially on the line 5—5 of Fig. 4.

Figure 1A:
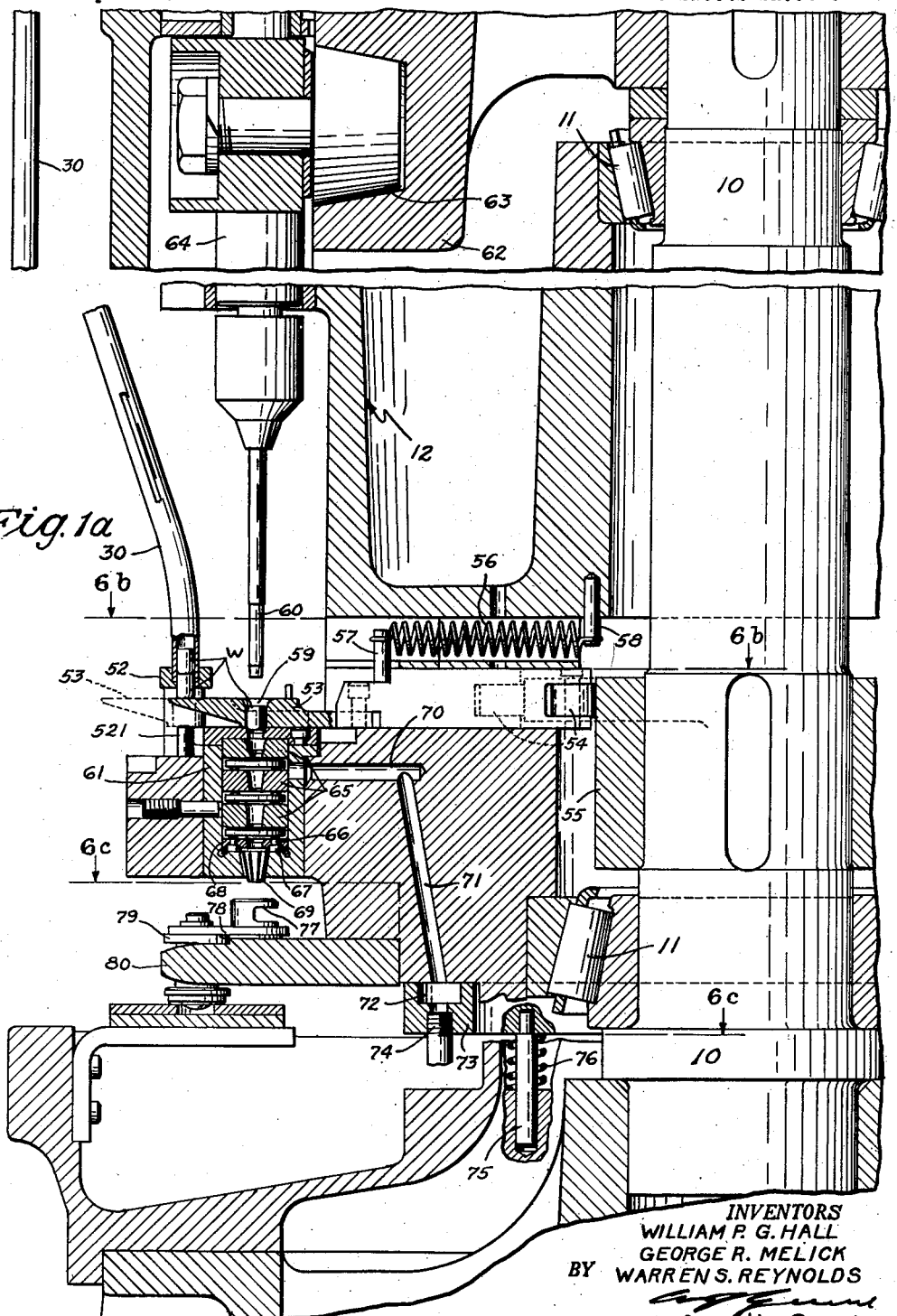

Fig. 6 comprises three fragmentary horizontal sections, susbtantially on the lines 6–a, 6–b and 6–c of Fig. 1.

Fig. 7 is a fragmentary, vertical radial section showing the draw dies and associated parts, the draw punch being substantially in its lowermost position.

Figure 4:
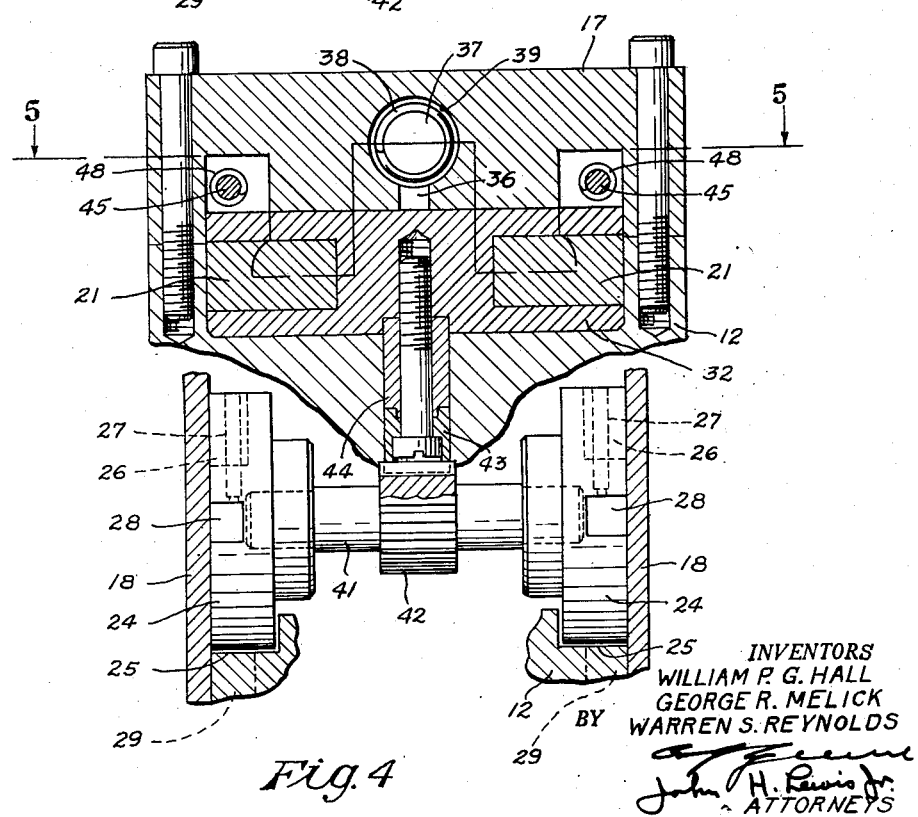
Fig. 4 is a transverse or tangential sectional elevation, substantially on the line 4—4 of Fig. 1.

The machine comprises a fixed centrally disposed column or pedestal 10 upon which is supported through suitable bearings 11 a turret body or frame identified generally by numeral 12. At the top of fixed column 10 is secured a work-holding hopper, a fragment of which is shown at 13. Secured to the upper portion of the turret and projecting within the open bottom of fixed hopper 13 is a revolving frusto conical member 14 comprising radial grooves 15 of such width as to receive the shortest dimension but not the longest dimension of the workpieces, so that the workpieces escape from the hopper into the groove 15 in column, all as more fully described in the patent to Reynolds et al., No. 2,538,706, January 16, 1951. There may be any convenient number, for example twenty-four, of the workpiece conveying grooves 15, and the same number of workpiece passages, orienting devices and draw die sets. Much of the description which follows will be directed to one of the plurality of lines. Each groove 15 communicates with a slot 16 in one lateral margin of a radially disposed support block 17 suitably secured to the turret body 12 (Fig. 4). There is one support block 17 associated with two adjacent workpiece carrying grooves 15, the two slots 16 which receive workpieces from the respective grooves 15 being located on opposite margins of the support block. Said slots 16 and other workpiece passages to be described are closed by flat side plates 18 secured at the top to the faces of block 17 and at the bottom to the turret frame 12 by suitable means such as thumb screws 19. Said side plates 18 may be of transparent material, and the apertures therein receiving the lower pair of thumb screws 19 may be slotted through the margins of the plates, as shown at 20, to enable the plates to be pivoted about upper thumb screws 19. This construction enables ready access to all workpieces in transit through the orienting device and associated parts. Each support block 17 extends radially inward toward the center of the turret and is formed to receive various workpiece controlling devices to be described.

Each workpiece receiving slot 16 extends generally vertically through the outer portion of support block 17. Associated with each slot 16 is a radially disposed transfer bar 21, which may comprise a shallow cut-out 211 extending from one end thereof to a cut-out 22 which is vertically disposed in one margin of the transfer bar. Means are provided for reciprocating the transfer bars from their innermost position, illustrated in Fig. 1, first, to the intermediate position, illustrated in Fig. 2, and, thereafter, to the outermost position, illustrated in Fig. 3. In the latter position, cutout 22 is aligned with the slot 16 and the lowermost workpiece therein drops into said cut-out, coming to rest against the adjacent surface of the turret frame. When the transfer bar is restored to its Fig. 1 position, the workpiece in cut-out 22 comes into alignment with a notch 23 through which the workpiece falls into position in juxtaposition to an orienting wheel 24 which occupies a recess 25 in turret body 12, the adjacent face of the turret body and the outer face of the orienting wheel 24 being covered by the aforementioned side plate 18. The orienting wheel 24 comprises a radially disposed recess 26 having centrally located therein a radially disposed pin 27, the depth of recess 26 being greater than the depth of the cup-shaped workpieces. Likewise in the orienting wheel, and substantially at right angles to the recess 26, is a diametrically disposed aperture 28 which, when the orienting wheel is in the Fig. 2 position, completes a tube-like path from the receiving notch 23 to a passage 29 formed in the turret body below the orienting wheel and communicating with a delivery tube 30.

Figure 2:
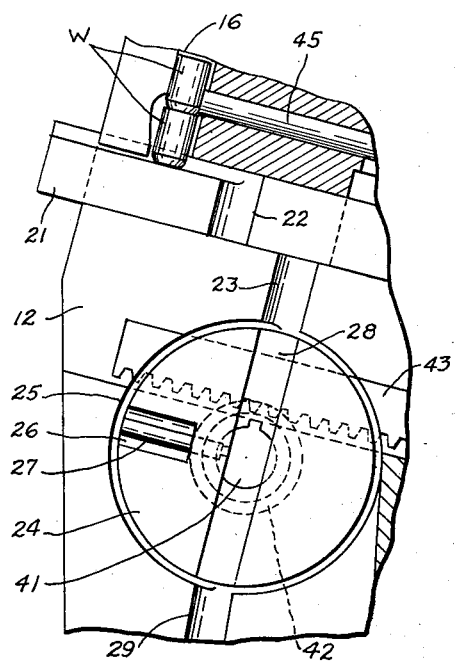
Fig. 2 is a fragmentary radial sectional elevation of a portion of the cup orienting device, the parts being advanced to such position as to effect delivery of a cup which is presented to the orienting device in correct head-down position.

It will be apparent that, the orienting wheel being in normal (Fig. 1) position, a workpiece W in the notch 23 presented to the orienting wheel in head-down position, as shown in full lines in Fig. 1, comes to rest against the end of pin 27 and remains there until the orienting wheel is rotated to its Fig. 2 position, at which time it falls through aperture 28 into passage 29. However, if the workpiece is presented to the wheel in mouth-down position, it falls over pin 27, as shown in broken lines in Fig. 1, and remains impaled on pin 27 until the orienting wheel is rotated 180° to the Fig. 3 position, at which time the workpiece, now in the desired head-down position, escapes into the passage 29. Thus, all workpieces enter delivery passage 29 in head-down position, regardless of the position in which they are presented to the orienting wheel.

The means for actuating the orienting wheel 24, transfer bar 21 and associated parts, will now be described: Associated with each support block 17 is an actuator 32 provided at its inner end with a cam following roller 33 which engages the surface of a cam 34 secured to the fixed column 10. Actuator 32 is guided for rectilinear substantially radial movement in a channel formed by upwardly and inwardly facing surfaces on turret body 12 and downwardly and inwardly facing surfaces on support block 17, all as illustrated in Fig. 4. A post 35, secured to and extending upwardly from actuator 32 through a longitudinal slot 36 in support block 17, is provided with a head 37 engaged by one end of a spring 38 occupying a longitudinal recess 39 in support block 17, the opposite end of spring 38 abutting the end of said recess adjacent the outer end of the block. Spring 38 thus serves to normally maintain roller 33 in contact with the cam 34 but enables the actuator and associated parts to remain in an outwardly displaced position in the event of a jam of workpieces in transit through the passages heretofore described. Two transfer bars 21 are associated with each actuator 32, occupying recesses in the margins of the actuator, as shown in Fig. 4. Each transfer bar 21 is provided with abutments 212 extending above and below the transfer bar into slots 321 in the actuator. Each transfer bar is thrust outward by suitable means such as a spring 40 occupying a recess in the actuator 32 located inwardly from the aforementioned transfer bar receiving recess. Each transfer bar can thus yield relative to its actuator by an amount determined by the length of the slots 321.

The configuration of cam 34 is such as to displace the transfer bars and other mechanism to be described through the sequence of positions shown in Figs. 1, 2 and 3, there being a dwell on the cam to maintain the parts actuated thereby in the Fig. 2 position for a time sufficient to enable a head-down workpiece to traverse the aperture 28 and escape into passage 29. To actuate the orienting wheels 24, such wheels are secured to an arbor 41 carrying a pinion 42 engaged by a rack 43 secured through a mounting block 44 to the mid-portion of actuator 32. The orienting wheels are thus operated in synchronism with the transfer bars.

To provide for retaining workpieces in the slots 16 during displacement of the transfer bar from normal position, and for delivering them one-at-a-time to said transfer bars, a detent rod 45 is mounted in a counterbored recess in support block 17 and is provided with a head 46 forming an abutment for a collar 47 loosely mounted on the detent rod. A spring 48 is compressed between said collar 47 and a ring 49 secured to the detent rod. Collar 47 is also provided with a lug 50 received in an aperture in actuator 32, which actuator thus displaces detent rod 45 through the medium of spring 48. When the forward end of detent rod 45 is in engagement with the lowermost workpiece in slot 16, as shown in Figs. 2 and 3, further movement of actuator 32 merely compresses spring 48. There is thus provided a very efficient means for presenting workpieces one-at-a-time to the orienter, for passing such workpieces as are presented in head-down position, for positively inverting such workpieces as are presented in mouth-down position and delivering them in head-down position, all actuated in such a way that a jam in any part of the workpiece passages merely interrupts the delivery of workpieces, instead of causing a smash-up. Moreover, any jams can be readily corrected by merely swinging a cover plate 18 aside to afford access to the workpiece passages in the manner above described.

The tube 30 which receives the workpieces from the orienter terminates in an apertured ring 52, and the lowermost workpiece therein comes to rest, while partly within the aperture in ring 52, upon the upper surface of a die-feeding bar 53 (Figs. 1a and 7) radially disposed in the turret body and provided at its inner end with a cam following roller 54 adapted to engage the surface of a cam 55 secured to the fixed column 10. Roller 54 may be held in contact with the cam surface by suitable means, such as a spring 56 tensioned between a post 57 secured to the die-feeding bar 53 and a post 58 secured to the turret body. Said cam displaces the die-feeding bar outwardly from the full line to the dotted line (Fig. 1a) position in which position an aperture 59 therein is aligned with and receives the lowermost workpiece in the aperture in ring 52, the workpiece coming to rest on a pin 521, the top of said pin being flush with the top of die holder 61. Thereafter, inward movement of the die-feeding bar to the Fig. 1 position brings said workpiece into alignment with a draw punch 60 and with a die-and-stripper stack mounted in a die holder 61 securedly held in the turret body and parts rigidly attached thereto. Draw punch 60 is actuated in synchronism with the movement of the die-feeding bar 53, the bar being slotted to enable its displacement during part of the punch movement, by means of a box cam 62 secured to pedestal 10 and engaged by cam following roller 63 mounted on punch actuating rod 64. The die stack may comprise any desired number of draw dies 65, three having been illustrated. Each die, except the lowermost, is supported from the die beneath it through suitable bearings. The lowermost die is supported on a bearing which in turn is supported on lugs 66 provided with enlarged heads 67 which bear against the bottom of the die holder. The lug heads 67 are loosely received in apertures in the flange 68 of a stripper member having the function of stripping drawn workpieces from the draw punch 60 as the punch begins its upward movement from the Fig. 7 position to the Fig. 1 position. Said stripper comprises a generally cylindrical body consisting of a plurality of separate spring fingers 69, all being biased inwardly (toward the punch) and all being joined to flange 68 by integral webs of such width and metal specification as to provide that the fingers 69 may be displaced outwardly by the passage between them of a drawpiece, and spring into contact with the punch surface as soon as the drawpiece has passed them. This type of stripper has been found particularly suitable, desirable and dependable for use in applicant's machine.

A lubricant or coolant is applied to each die stack through passages 70—71 in the turret body and associated respectively with the die stacks. Each passage 71 opens to an arcuate lubricant reservoir 72 in a fixed ring 73 to which coolant is supplied through a connection 74 by a suitable pump (not shown). Ring 73 is supported from adjacent stationary parts on pins 75 and springs 76, said springs serving to maintain an adequately close contact between the juxtaposed surfaces of the ring and the turret body to enable coolant to be forced from the reservoir 72 through the passages 71—70 to the die stacks.

Each downward movement of punch 60 to the Fig. 7 position carries a drawpiece D into a receptacle or bushing 77 carried in an arm 78 projecting from a link of a sprocket chain 79 which traverses a sprocket wheel 80 secured to the turret body. Either the turret body or the chain is driven by suitable means (not shown), and the relationship of the teeth of sprocket wheel 80 to die holder 61 is such that throughout the portion of the turret which is traversed by the sprocket chain a receptacle 77 is aligned with each die holder and die stack therein. Means are thus provided for conveying the drawpieces out of the machine and to other turrets (not forming parts of the present invention) where other operations are performed upon them.

What is claimed is:

1. Apparatus for receiving cup-shaped articles in a plurality of orientations and delivering a succession of such articles each in head-down orientation, said apparatus comprising an orienting wheel rotatable about a substantially horizontal axis, said wheel having a diametrical aperture extending transversely through said wheel and a radial recess rotationally displaced from said aperture, a fixed radial pin in said recess terminating at the periphery of said wheel, means for presenting said cup-shaped articles one at a time to the upper periphery of said wheel in alignment with said radial recess, a delivery passage for receiving workpieces from said wheel in a diametrically opposed position to said means for presenting workpieces, and means for rotating said wheel after delivery of a workpiece in alignment with said radial recess to first align said diametrical aperture in alignment with said delivery passage and then to further rotate said wheel to position said radial recess in opposition to said delivery passage.

2. Apparatus according to claim 1 in which said means for presenting workpieces to said wheel comprises a transfer bar having a workpiece holding notch therein, and means for shifting said bar to move said notch from a workpiece receiving position to a workpiece delivering position in alignment with the recess in said wheel.

3. Apparatus according to claim 2 comprising a support block having therein a passage for workpieces in transit to said transfer bar, and a detent held in said support block and adapted to retain workpieces in said passage during a portion of the displacement of said transfer bar from normal position.

4. Apparatus according to claim 3 comprising a common actuator for said orienting wheel, said transfer bar and said detent.

5. Apparatus according to claim 4 in which said actuator comprises a follower, a cam engaged by said follower, and a spring housed in said support block and normally holding said follower in engagement with said cam.

6. Apparatus according to claim 4 in which said detent comprises an elongated rod held in an aperture in said support block, an abutment on said rod, a connector secured to said actuator and loosely held on said rod, and a spring held beween said connector and said abutment.

7. Apparatus according to claim 4 in which said transfer bar is held in a recess in said actuator and comprises a lug extending into a guide slot in said actuator.

8. Apparatus according to claim 7 comprising a spring connection between said actuator and said transfer bar, whereby said actuator can be displaced by said cam without moving said transfer bar in the event that movement of said transfer bar is obstructed.

9. Apparatus according to claim 8, in which said spring connection comprises a spring housed in a recess in said actuator in alignment with said transfer bar recess.

10. Apparatus according to claim 9 comprising an orienting wheel operating rack and connections therefrom to said actuator.

11. Apparatus according to claim 10 in which each actuator actuates a plurality of orienting wheels and their associated transfer bars and detents.

12. Apparatus according to claim 11 in which each assembly of support block actuator, transfer bars and orienting wheels comprises a unit having substantially planar lateral faces, the workpiece passages being recesses opening through said planar faces.

13. Apparatus according to claim 12 comprising removable cover plates held in juxtaposition to said planar faces and covering said workpiece passages.

14. Apparatus according to claim 13 in which said side plates are of transparent material.

References Cited in the file of this patent
UNITED STATES PATENTS

| | | |
|---|---|---|
| 1,158,045 | Graham | Oct. 26, 1915 |
| 1,175,855 | Williamson | Mar. 14, 1916 |
| 1,230,811 | Shippee | June 19, 1917 |
| 1,609,994 | Ellis | Dec. 7, 1926 |
| 2,261,060 | Giesler | Oct. 28, 1941 |
| 2,341,667 | Stacy | Feb. 15, 1944 |
| 2,369,260 | Slater | Feb. 13, 1945 |
| 2,371,126 | Best et al. | Mar. 13, 1945 |
| 2,570,903 | Yost | Oct. 9, 1951 |
| 2,630,221 | Stewart | Mar. 3, 1953 |
| 2,679,311 | Turner | May 25, 1954 |
| 2,696,902 | Bailey et al. | Dec. 14, 1954 |